(12) United States Patent
Kalman et al.

(10) Patent No.: US 12,395,247 B2
(45) Date of Patent: *Aug. 19, 2025

(54) COHERENT FIBER BUNDLE PARALLEL OPTICAL LINKS

(71) Applicant: AVICENATECH CORP., Sunnyvale, CA (US)

(72) Inventors: Robert Kalman, Sunnyvale, CA (US); Bardia Pezeshki, Sunnyvale, CA (US); Alexander Tselikov, Sunnyvale, CA (US); Cameron Danesh, Sunnyvale, CA (US)

(73) Assignee: AvicenaTech, Corp., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,669

(22) Filed: Mar. 21, 2024

(65) Prior Publication Data

US 2024/0305379 A1    Sep. 12, 2024

Related U.S. Application Data

(63) Continuation of application No. 18/478,490, filed on Sep. 29, 2023, which is a continuation of application No. 17/935,699, filed on Sep. 27, 2022, now Pat. No. 11,791,901, which is a continuation of application No. 17/335,939, filed on Jun. 1, 2021, now Pat. No. 11,476,942.

(60) Provisional application No. 63/033,170, filed on Jun. 1, 2020.

(51) Int. Cl.
*H04B 10/50* (2013.01)
*G02B 6/04* (2006.01)
*H04B 10/25* (2013.01)
*H04B 10/40* (2013.01)

(52) U.S. Cl.
CPC ............. *H04B 10/502* (2013.01); *G02B 6/04* (2013.01); *H04B 10/25* (2013.01); *H04B 10/40* (2013.01)

(58) Field of Classification Search
CPC ...... H04B 10/502; H04B 10/25; H04B 10/40; H04B 10/2581; H04B 10/801; H04B 10/50; H04B 10/294; H04B 10/25891; H04B 10/506; H04B 10/60; H04B 10/2589; H04B 10/501; H04B 10/503; H04B 10/1143; H04B 10/116; G02B 6/04; G02B 6/4249; G02B 6/43; G02B 6/46; G02B 6/02042; G02B 6/02047; G02B 6/02319; G02B 6/02295; H01S 5/40; H01S 5/4025; H01L 25/167; H01L 27/156

See application file for complete search history.

(56) References Cited

U.S. PATENT DOCUMENTS

| | | |
|---|---|---|
| 5,497,465 A | 3/1996 | Chin et al. |
| 5,557,693 A | 9/1996 | Stevens et al. |
| 5,844,239 A | 12/1998 | Kimura |

(Continued)

OTHER PUBLICATIONS

International Search Report by International Searching Authority (KIPO) in related PCT Application No. PCT/US2021/035249 dated Sep. 17, 2021.

(Continued)

*Primary Examiner* — Hibret A Woldekidan

(57) ABSTRACT

A coherent fiber bundle may be used to optically connect an array of microLEDs to an array of photodetectors in an optical communication system.

8 Claims, 8 Drawing Sheets

(56) References Cited

U.S. PATENT DOCUMENTS

| | | | |
|---|---|---|---|
| 6,167,075 A | 12/2000 | Craig et al. | |
| 6,367,989 B1 | 4/2002 | Hartman et al. | |
| 6,434,308 B1 | 8/2002 | Trezza | |
| 6,527,456 B1 | 3/2003 | Trezza | |
| 7,965,913 B2 | 6/2011 | Chan et al. | |
| 9,395,296 B1 * | 7/2016 | Milton | G02B 6/06 |
| 9,645,331 B1 | 5/2017 | Kim | |
| 10,860,142 B1 * | 12/2020 | Northcott | G02B 6/04 |
| 11,810,534 B1 | 11/2023 | Qiao et al. | |
| 2004/0159777 A1 | 8/2004 | Stone | |
| 2005/0168819 A1 | 8/2005 | Vail et al. | |
| 2006/0007531 A1 | 1/2006 | Korengut et al. | |
| 2006/0034572 A1 | 2/2006 | Morris et al. | |
| 2007/0058976 A1 | 3/2007 | Tatum et al. | |
| 2009/0252451 A1 | 10/2009 | Lagakos et al. | |
| 2012/0251045 A1 | 10/2012 | Budd et al. | |
| 2015/0063755 A1 | 3/2015 | Doany et al. | |
| 2015/0241645 A1 | 8/2015 | Khalid | |
| 2018/0038680 A1 * | 2/2018 | Reolon | G01B 11/0608 |
| 2018/0090058 A1 * | 3/2018 | Chen | G09G 3/32 |
| 2018/0227055 A1 * | 8/2018 | Khatibzadeh | H10H 20/824 |
| 2018/0269191 A1 | 9/2018 | England et al. | |
| 2020/0119236 A1 * | 4/2020 | Yang | H10H 20/855 |
| 2021/0044748 A1 | 2/2021 | Hu et al. | |
| 2021/0320726 A1 | 10/2021 | Kalman et al. | |

OTHER PUBLICATIONS

Lee et al., "Low-Cost and Robust 1-Gbit/s Plastic Optical Fiber Link Based on Light-Emitting DiodeTechnology", Proc. Opt. Fiber Communication Conference Expo/National Fiber Optics Eng. Conference, 2008.

Supplementary European Search Report by the European Patent Office in related EP Application No. 21818754.0 dated May 27, 2024.

Written Opinion by International Searching Authority (KIPO) in related PCT Application No. PCT/US2021/035249 dated Sep. 17, 2021.

Yahav et al., "Multi-Gigabit Spatial-Division Multiplexing Transmission Over Multicore Plastic Optical Fiber", Journal of Lightwave Technology, vol. 39, No. 8, Apr. 15, 2021, pp. 2296-2304.

Office Action issued by China National Intellectual Property Administration ("CNIPA") in related Chinese Patent Application No. 202180045816.4 dated May 27, 2025.

* cited by examiner

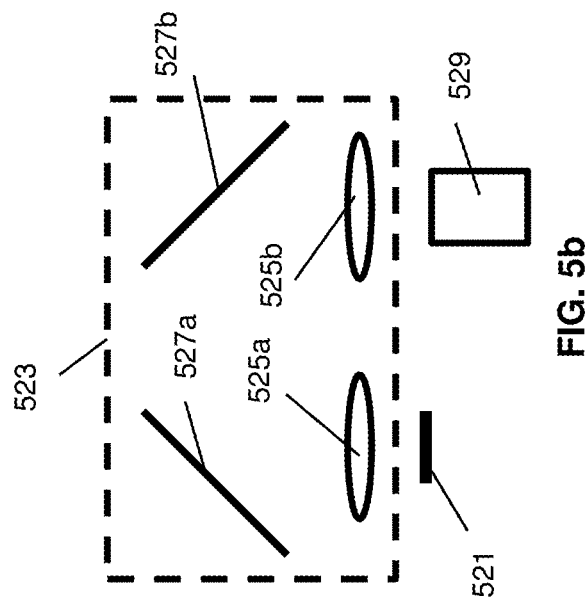
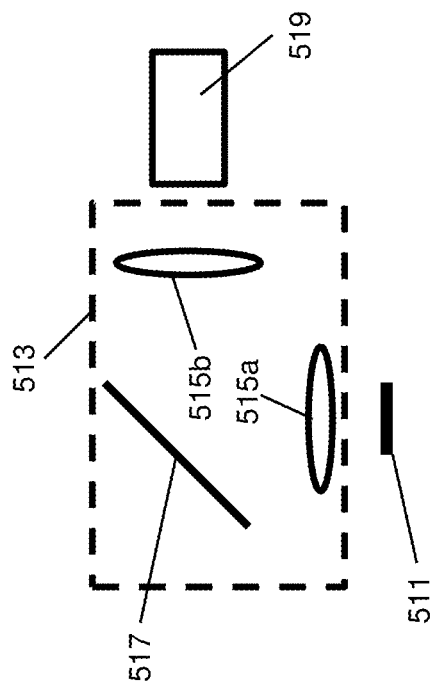
FIG. 5b
FIG. 5a

COHERENT FIBER BUNDLE PARALLEL OPTICAL LINKS

CROSS-REFERENCE TO RELATED APPLICATION

This application is a continuation of U.S. patent application Ser. No. 18/478,490, which is a continuation of U.S. patent application Ser. No. 17/935,699, now U.S. Pat. No. 11,791,901, filed Sep. 27, 2022, which is a continuation of U.S. patent application Ser. No. 17/335,939, now U.S. Pat. No. 11,476,942, filed Jun. 1, 2021, which claims the benefit of the filing date of U.S. Provisional Patent Application No. 63/033,170 filed on Jun. 1, 2020, the disclosures of which are incorporated by reference herein.

FIELD OF THE INVENTION

The present invention relates generally to generally to optical communications using microLEDs, and more particularly to optical communication systems using microLEDs and fiber bundles.

BACKGROUND OF THE INVENTION

Computing and networking performance requirements are ever increasing. Prominent applications include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple ICs.

However, the benefits of further transistor shrinks are decreasing dramatically as decreasing marginal performance benefits combine with decreased yields and increased per-transistor costs. Independent of these limitations, a single IC can only contain so much functionality, and that functionality is constrained because the IC's process cannot be simultaneously optimized for different functionality, e.g. logic, DRAM, and I/O. In fact, there are significant benefits to "de-integrating" SoCs into smaller "chiplets", including: the process for each chiplet can be optimized to its function, e.g. logic, DRAM, high-speed I/O, etc.; chiplets are well-suited to reuse in multiple designs; chiplets are less expensive to design; chiplets have higher yield because they are smaller with fewer devices.

However, a major drawback to chiplets compared to SoCs is that use of chiplets generally requires far more chip-to-chip connections. Compared to the on-chip connections between functional blocks in SoCs, chip-to-chip connections are typically much less dense and require far more power (for example normalized as energy per bit).

Coupling optical sources and detectors to waveguides (including fibers) frequently dominates the cost of optical links and limits their density.

BRIEF SUMMARY OF THE INVENTION

Optical interconnects based on microLED (uLED) sources may offer a way to overcome some or all of these limitations. A microLED may be generally defined as a LED with a diameter of <100 um in some embodiments, <20 um in some embodiments, <4 um in some embodiments, and <1 um in some embodiments, and can be made with diameters <1 um. In some embodiments the uLED sources can support optical links with lengths of >1 m at >1 Gbps with lower drive power and very high density.

Coherent fiber bundles (CFBs) comprised of large numbers of tightly packed fibers are typically used in imaging and illumination applications. However, their unique properties are well-suited to overcoming cost and density issues in short, highly parallel optical links for chip-to-chip interconnects. In some embodiments a coherent fiber bundle provides an optical link for data communications between an optical transmitter and an optical receiver. In some embodiments the optical transmitter includes an LED as a light source, in some embodiments the LED is a uLED. In some embodiments the optical receiver comprises a photodetector. In some embodiments the uLED, coherent fiber bundle, and photodetector are within a same package, which is termed a multichip module. In some embodiments the multichip module includes a plurality of semiconductor chips on a common substrate. In some embodiments the optical transmitter is of a first chip of the plurality of semiconductor chips. In some embodiments the optical receiver is of a second chip of the plurality of semiconductor chips. In some embodiments the optical transmitter is of a first optical transceiver associated with a first chip of the plurality of semiconductor chips. In some embodiments the optical receiver is of a second optical transceiver associated with a second chip of the plurality of semiconductor chips.

Some aspects provide an optical link for data communications between optical transmitters and optical receivers, comprising: an optical transmitter array including a plurality of optical transmitter sub-arrays, each optical transmitter sub-array of the plurality of optical transmitter sub-arrays comprising a plurality of microLEDs; a fiber bundle comprised of a plurality of sub-bundles, each sub-bundle comprised of a plurality of multimode fibers, each fiber including a core, the cores of each sub-bundle of the plurality of sub-bundles to receive light from a corresponding one of the optical transmitter sub-arrays; and an optical receiver array including a plurality of optical receiver sub-arrays, each optical receiver sub-array of the plurality of optical receiver sub-arrays comprising a plurality of photodetectors, each optical receiver sub-array of the plurality of optical receiver sub-arrays to receive light from cores of the fiber bundle.

In some aspects the optical transmitter array is of a first optical transceiver associated with a first semiconductor chip. In some aspects the optical receiver array of a second optical transceiver associated with a second semiconductor chip. In some aspects coherence is maintained between fibers within each sub-bundle. In some aspects coherence is not maintained between fibers in different sub-bundles. In some aspects relative positions of outputs of fibers in each sub-bundle of the plurality of sub-bundles are the same as relative positions inputs of fibers in each sub-bundle. In some aspects the microLEDs are attached to a first substrate. In some aspects the microLEDs are attached to an IC that also includes microLED drive circuitry. In some aspects the photodetectors are mounted to a second substrate. In some aspects the photodetectors are monolithically integrated with receiver circuits on an IC. In some aspects light from each microLED is coupled into only a single core. In some aspects each photodetector is to receive light from only a single core. In some aspects light from each microLED is coupled into multiple cores. In some aspects a plurality of photodetectors are to receive light generated by each microLED. Some aspects further comprise at least one turning mirror to direct light from the microLEDs towards inputs of the fiber bundle. Some aspects further comprise a turning mirror for each optical transmitter sub-array, to direct light from microLEDs of the optical transmitter sub-array towards inputs of the sub-bundle associated with the optical transmitter sub-array. Some aspects further comprise an input array optical coupling assembly coupling the optical transmitter array and the fiber bundle. In some aspects the input array optical coupling assembly comprises a forty-five degree turning mirror such that light incident on the mirror is reflected at a ninety degree angle, a first lens positioned between the turning mirror and the microLEDs, and a second lens positioned between the turning mirror and the fiber bundle.

These and other aspects of the invention are more fully comprehended upon review of this disclosure.

BRIEF DESCRIPTION OF THE DRAWINGS

FIG. 5a shows a single turning mirror placed between two lenses to turn a beam 90°.

FIG. 5b shows the use of two turning mirrors to turn the beam 180°.

DETAILED DESCRIPTION

Figure 1:
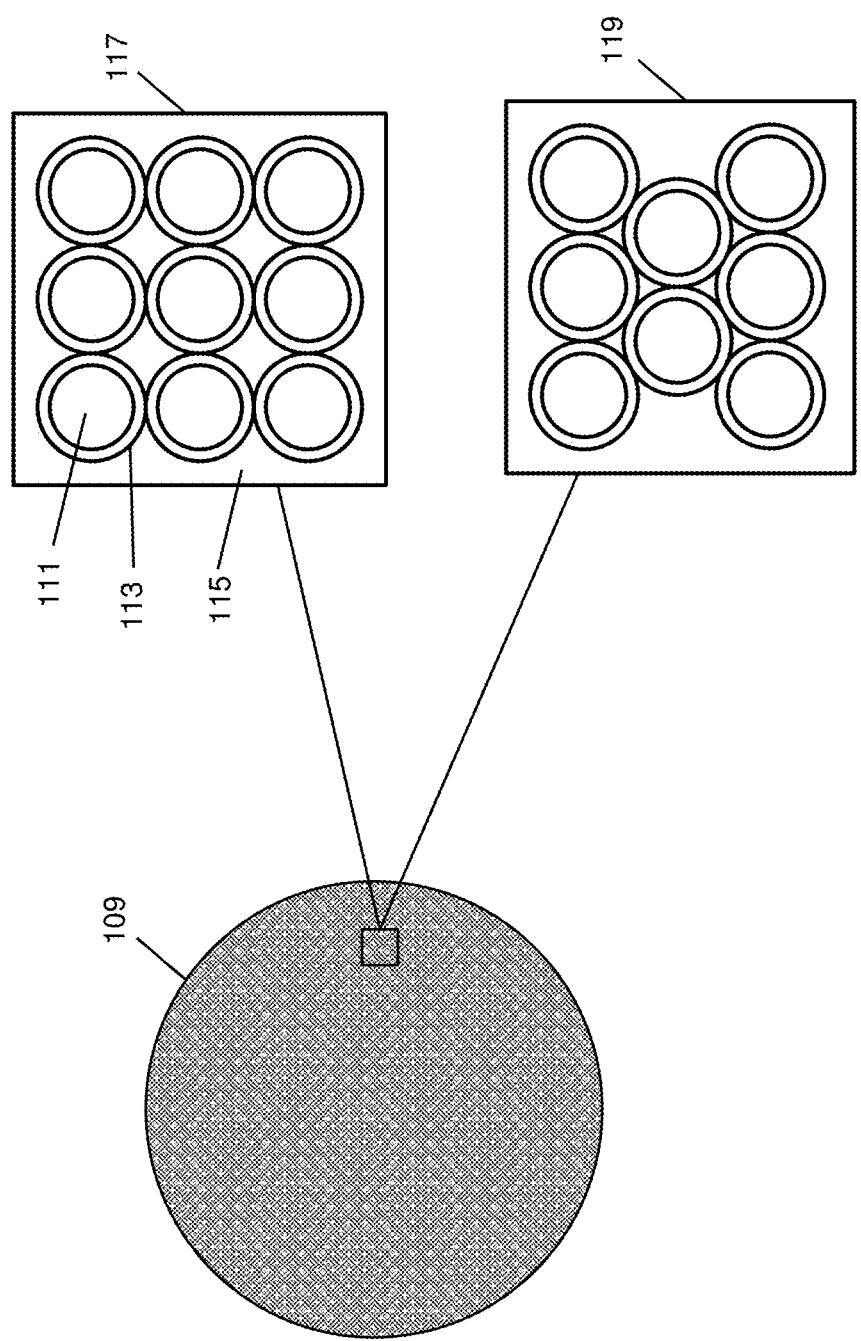
FIG. 1 shows a cross-sectional view of an embodiment of a coherent fiber bundle.

A cross-section of an embodiment of a coherent fiber bundle (CFB) 109 is shown in FIG. 1. The coherent fiber bundle includes a plurality of cores 111 for the transmission of light. Each core is surrounded by a concentric cladding layer 113 that has a lower index of refraction than the core. Light is guided in the cores; each core plus cladding may be referred to as a "fiber." Multimode fibers are preferred for use with microLED sources as multimode fibers allow for greater coupling of light from microLEDs than for single-mode fiber. The numerical aperture (NA) of a fiber is defined as $NA = \sin(\theta_c)$, where $\theta_c$ is the maximum external acceptance angle of the fiber (relative to the fiber's propagation axis); rays at angles larger than $\theta_c$ are not guided by the fiber.

A large number of fibers may be grouped together in a "bundle." In some embodiments, the fibers may be arranged in a regular pattern, such as on a square grid 117 or hexagonal grid 119. In other embodiments, cores of multiple sizes may be used to improve packing density. Some kind of jacket material 115 such as a polymer or glass may be used in the interstitial areas between the fibers to hold the bundled fibers together. In some embodiments, the jacket material is the same as the cladding material. In some embodiments, the jacket material may be highly optically absorbing to attenuate any light not propagating in a core.

Figure 2:
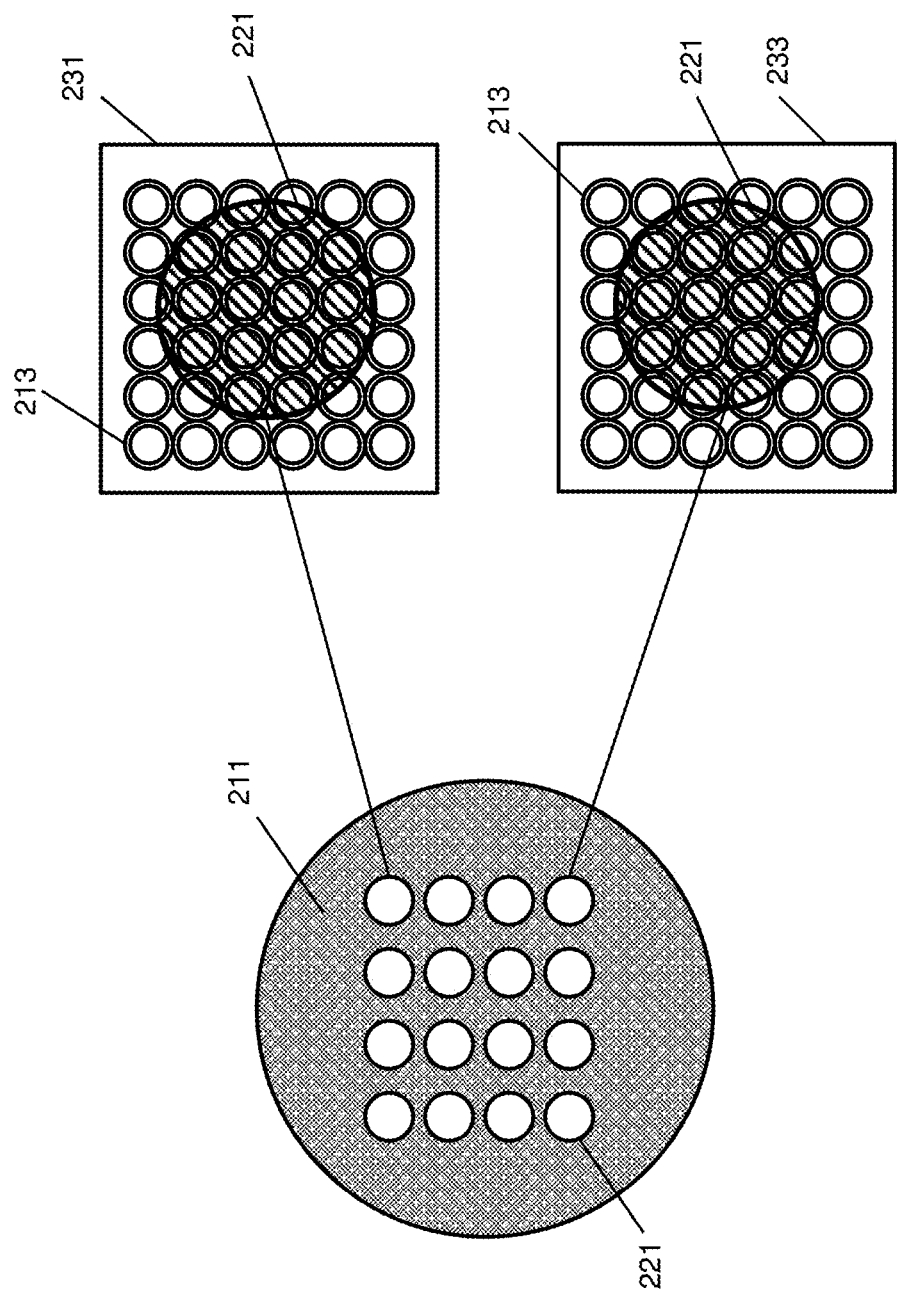
FIG. 2 shows a cross-sectional view of a coherent fiber bundle with spatially-sampled optical distribution on an input face of the coherent fiber bundle and at an output face of the coherent fiber bundle.

The bundle is referred to as "coherent" if the relative positions of the fibers are the same at the fiber output as at the fiber input, e.g. the fibers do not cross over each other so the relative input and output positions of the fibers are preserved. A CFB reproduces a spatially-sampled version of the optical distribution on its input face at its output face, where the spatial sampling resolution is equal to the core-to-core spacing. FIG. 2 shows a cross-sectional view of a coherent fiber bundle with spatially-sampled optical distribution on an input face of the coherent fiber bundle and at an output face of the coherent fiber. In FIG. 2, for the CFB 211, a plurality of spots 221 illuminate cores within the spots. A first exploded view shows a portion of an input face 231 of the CFB, with cores 213, arranged in a square grid pattern, and the spot illuminating some of the cores. A second exploded view shows a portion of an output face 233 of the CFB, again with cores 213, arranged in the same pattern, and the spot illuminating those same cores.

Figure 3:
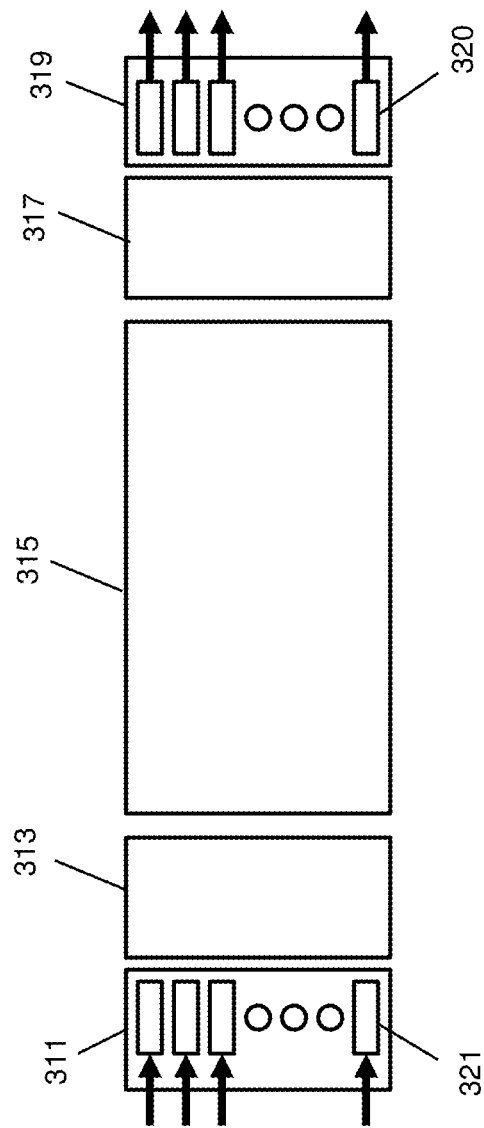
FIG. 3 shows a parallel optical link using a coherent fiber bundle.

FIG. 3 shows a parallel optical link using a coherent fiber bundle. An optical transmitter array 311 is coupled to the CFB 315 by an input array optical coupling assembly (IAOCA) 313. An output of the CFB is coupled to a receiver array 319 by an output array optical coupling assembly (OAOCA) 317.

Figure 4A:
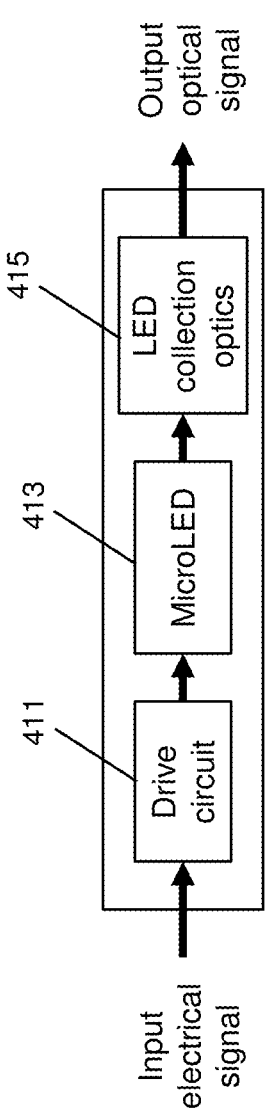
FIG. 4a is a block diagram of an example transmitter.

The optical transmitter array comprises an array of individual transmitters 321. A block diagram of an example transmitter is shown in FIG. 4a. A transmitter comprises a microLED drive circuit 411. The drive circuit is to receive an input electrical signal, and drive a microLED 413. The microLED outputs an optical signal modulated by the input electrical signal. In some set of embodiments, the drive circuit comprises equalization circuitry that increases the maximum data rate supported by the transmitter. In a set of embodiments, the electrical and optical signals utilize non-return-to-zero (NRZ) modulation. In other embodiments, other modulation formats may be used, such as PAM-N and N-QAM, where N is a power of two. The transmitter of FIG. 4a is shown as including LED collection optics 415. In some embodiments the LED collection optics may not be considered as part of the transmitter, with instead the LED collection optics being part of the input array optical coupling assembly of FIG. 3, for example.

Figure 4B:
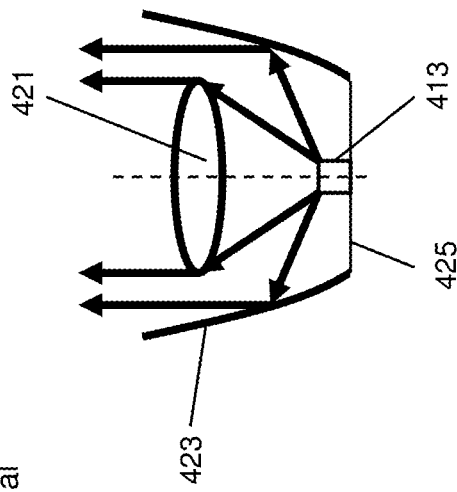
FIG. 4b shows an embodiment of LED collection optics comprising a lens and parabolic mirrors.

In some sets of embodiments, LED collection optics are used to collect the light emitted by the microLED. The LED collection optics may comprise an encapsulant layer, lenses, flat mirrors, and/or curved mirrors. FIG. 4b shows an embodiment of LED collection optics comprising a lens 421 and mirrors or reflectors 423, which may be curved, for example parabolic, or flat. These optics collect the light from the microLED 413 and reduce the angular cone of the optical distribution compared to that emitted directly from the microLED.

In some sets of embodiments, the microLEDs in a transmitter array are all attached to a single substrate 425. The substrate may be made from various materials including sapphire, silicon, glass, ceramic, or the same semiconductor material as the microLED, e.g. GaN, GaAs, or InP.

Figure 4C:
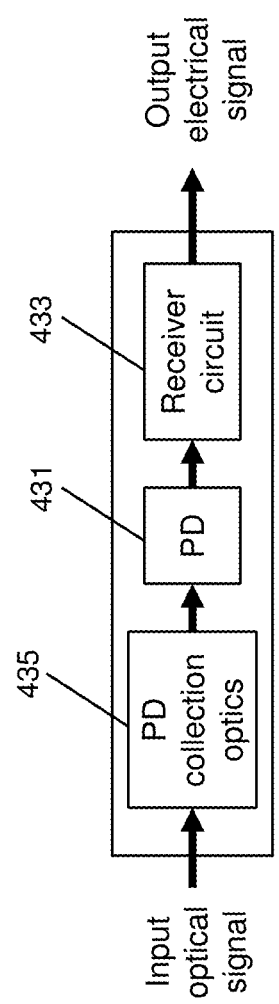
FIG. 4c is a block diagram of an example receiver.

A receiver array comprises an array of individual receivers. A block diagram of an example receiver is shown in FIG. 4c. The receiver comprises one or more photodetectors (PDs) 431 and receiver electronics 433. In a set of embodiments, the receiver also includes PD collection optics 435 placed in front of the PD(s), although in some embodiments the PD collection optics may be part of an output array optical coupling assembly (with output referring to an output of a fiber bundle, for example). The PD collection optics may comprise one or more lenses and spatial filtering elements. In a set of embodiments, a receiver contains one photodetector (PD). In another set of embodiments, a receiver contains more than one PD. Each PD converts an input optical signal to an output electrical signal. The electrical output signals from the PD or PDs are connected to the receiver circuit that amplifies the signal. In some embodiments, the receiver circuit also comprises an equalizer, a decision circuit, a limiting amplifier, and/or buffer amplifiers.

In some sets of embodiments, all of the PDs in the array are mounted to a single substrate. The substrate may be made from various materials including sapphire, silicon, glass, ceramic, or the same semiconductor material as the PD, e.g. Si, Ge, or InGaAs. In some sets of embodiments, the circuitry for some or all of the receivers are integrated onto a common IC. In some sets of embodiments, the PDs are monolithically integrated with the receiver circuits. This is especially useful for materials in which high-performance, high-density, low-cost electronics are available such as silicon.

Referring again to FIGS. 2 and 3, the input optical coupling assembly couples the light from each optical transmitter to form an optical distribution (a "spot") on the input face of the CFB. In a set of embodiments, the spot from each transmitter is small enough and aligned in a way that it is coupled into only one core of the CFB. In another set of embodiments, the light from each transmitter forms a larger spot such that it is coupled into N cores of the CFB, for example as shown in FIG. 2. In some of these embodiments, there is no significant overlap between the input optical spots from different transmitters so that a given core carries light from only a single optical source, or does not carry light at all. In other embodiments, there is some overlap between the optical spots at the input face of the CFB so that some cores carry light from two or more transmitters.

In a set of embodiments, the transmitter array may be arranged in a regular pattern, e.g. a square, rectangular, or hexagonal grid. Similarly, the fibers in a CFB may be arranged in some regular pattern. In embodiments where a core carries light from a single transmitter (or no light at all), the pattern of the cores carrying light matches that of the transmitter array. In a further set of embodiments, optics with magnification M are interposed between the transmitter array and the CFB; in these embodiments, the CFB core pattern is the same as that of the transmitter array but magnified by M.

In embodiments where light from a single transmitter is coupled to multiple cores, the CFB grid may not match that of the transmitter array. In a set of embodiments, neither the transmitter array nor the cores is on a regular grid. As the number of cores per transmitter spot increases, there is less variation in optical link loss as an input optical spot is moved across the input face of the CFB. Compared to coupling each transmitter to a single core, the embodiments where each transmitter is coupled to multiple cores provide benefits including: a) Non-critical optical source-to-fiber alignment: Each spot that falls anywhere on the input face of the CFB will propagate to the output end of the CFB; b) Support for various transmitted spot sizes: Different input spot sizes merely illuminate different numbers of cores; c) Support for various transmitted spot spacing: The center-to-center spacing of spots is flexible as long as the spots are incident on the CFB face—if the gap between spots is greater than one core diameter, a given core will carry light from only a single source; d) Support for various numbers of transmitted spots: Again, any input spot distribution is supported as long as all spots fall on the CFB's input face.

The output light from the transmitter array is relayed to the input face of the CFB by the IAOCA, for example the IAOCA of FIG. 3, which comprises one, some, or all of lenses, flat mirrors, and/or curved mirrors. In a set of embodiments, the IAOCA may magnify the optical distribution from the transmitter array by a magnification M, where the spot size and center-to-center spot spacing scales as M while the angular spread from each LED scales as 1/M. This allows the angular spread to be matched to the NA of the CFB cores to achieve high coupling efficiency. In some embodiments, the IAOCA may be omitted, with for example the transmitter array butt-coupled to the CFB.

In a set of embodiments, the IAOCA comprises one or more turning mirrors, allowing the beam direction to be changed. This may allow CFB-based optical links to fit within tight space constraints. FIG. 5a shows a single turning mirror placed between two lenses to turn the beam 90°. As illustrated in FIG. 5a, an array of microLEDs 511, with their collection optics, is positioned below an input array optical coupling assembly (IAOCA) 513. The IAOCA includes a first lens 515a, a turning mirror 517, and a second lens 515b. The first lens is positioned between the microLEDs and the turning mirror. The turning mirror is angled at 45° relative to vertical and horizontal planes, so as to redirect light from a vertical direction to a horizontal direction. The second lens is positioned between the turning mirror and a coherent fiber bundle (CFB) 519. The CFB is shown as being to a side of the IAOCA. FIG. 5b shows the use of two turning mirrors to turn the beam 180°. As in FIG. 5a, in FIG. 5b an array of microLEDs 521, with their collection optics, is positioned below an input array optical coupling assembly (IAOCA) 523. The IAOCA of FIG. 5b includes a first lens 525a, a first turning mirror 527a, a second turning mirror 527b, and a second lens 515b. The first lens is positioned between the microLEDs and the first turning mirror. The first turning mirror is angled at 45° relative to vertical and horizontal planes, so as to redirect light from a vertical direction to a horizontal direction. The second lens is positioned to direct light from the from the first turning mirror back to the vertical direction. The second lens is positioned between the second turning mirror and a coherent fiber bundle (CFB) 529. The CFB is shown as being below the IAOCA.

It is generally desirable that the CFB fibers have a high NA because that allows them to more efficiently capture light from microLED assemblies with a high angular spread. There are typically practical limits to the fiber NA based on material properties. The optical magnification techniques discussed above can match the angular spread of the transmitter array to the NA of the CFB cores by increasing the spot size from each microLED.

From an optical loss perspective, it is advantageous to maximize the ratio of core area to cladding area, since light launched into the cladding and jacket is lost. However, the trade-off is that core-to-core evanescent crosstalk increases as the core-to-core distance is decreased. The minimum distance between the cores that can be tolerated is generally a function of the link length, the number of cores between spots, and the core NA.

Another source of crosstalk is light that does not propagate in the cores but instead propagates in the cladding or the jacket material. If this light propagates to the output of the CFB, some of it may be coupled to the receiver array.

Because this light is not guided by the cores, some of it may be from adjacent channels and contribute inter-channel crosstalk.

To reduce crosstalk due to this light, in some embodiments the jacket material may be highly optically absorbing, for example at the signal wavelength. In some embodiments, this crosstalk may be reduced by employing spatial filtering elements in the output optical coupling assembly and/or the PD collection optics such that only light carried in the cores is coupled to the photodetectors.

Referring again to FIG. 3, the output array optical coupling assembly (OAOCA) relays light from the output face of the CFB to the receiver array. In a set of embodiments, the output optical coupling assembly may comprise one of or a combination of lenses, flat mirrors, spatial filtering elements, and curved mirrors, for example similar to or the same as that of the IAOCA. The spatial filtering elements may be comprised of optically absorbing materials that for example may be used to block light that did not travel in the CFB cores, thus reducing inter-channel crosstalk. In another set of embodiments, the OAOCA may be omitted, with for example the output face of the CFB butt-coupled to the receiver array.

As noted previously, if the light for each input signal channel is coupled into one or more CFB cores, the light propagates to the endface of the CFB to create an output optical "spot" that is a spatially-sampled version of the input optical spot. Each CFB output spot is relayed by the output optics to a corresponding "spot" in the PD plane; again, "spot" in the PD plane is an optical distribution associated with a single transmitter channel. In some embodiments, each PD plane spot falls on a single PD. Each PD may be larger than the spot in the PD plane, which may increase alignment tolerances. The disadvantage of increasing PD size is that it tends to increase PD capacitance, and may also pick up more inter-channel optical crosstalk.

Figure 6A:
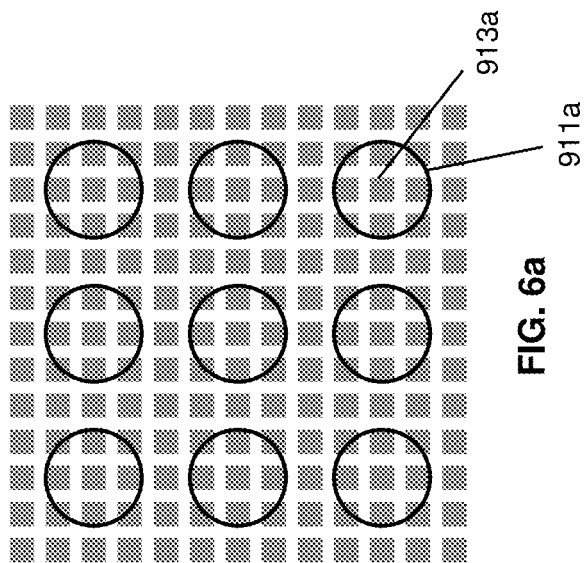
FIGS. 6a-c show photodetectors arranged in a grid pattern, with a plurality of "spots" illuminated with light.
Figure 6B:
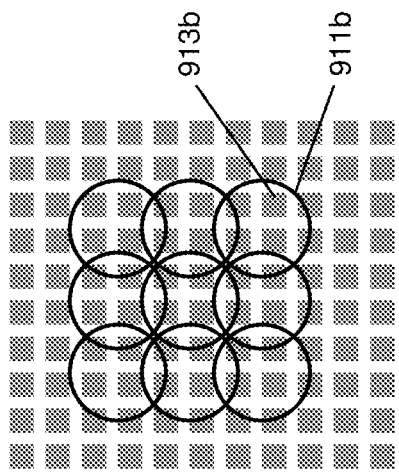
Figure 6C:
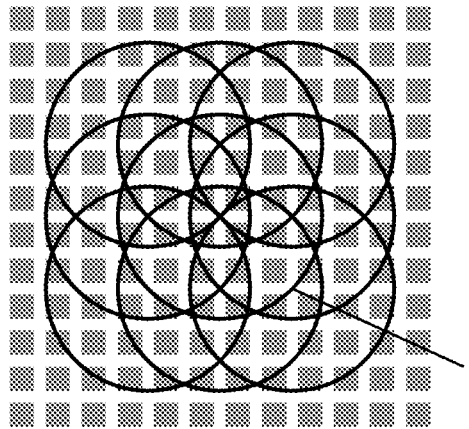

In another set of embodiments, each PD plane spot may illuminate multiple PDs as shown in FIGS. 6a-c. FIGS. 6a-c show PDs arranged in a grid pattern, with a plurality of "spots" illuminated with light. For FIG. 6a, each of nine spots, e.g. spot 911a, covers, in whole or in part, a 3×3 set of PDs, e.g., PD 913a. The spots in FIG. 6a do not overlap, with at least one PD present between spots. FIG. 6b is similar to FIG. 6a, with nine spots, e.g. spot 911b, each cover a plurality of PDs, e.g. PD 913b. The spots in FIG. 6b, however, partially overlap, with for example a central spot being partially overlapped by four other spots. FIG. 6c shows even greater overlap of spots, with for example a central spot 911c overlapped by eight adjacent spots. In FIGS. 6a-c, the PD plane comprises a regular grid of PDs. In a set of embodiments, the PDs are interconnected in some pattern with electrical switches. In some of these embodiments, an electrical switch comprises some type of transistor such as a field-effect transistor (FET).

If the switch between two PDs is in the "on" (low resistance) state, the currents from the PDs are summed. A set of PDs connected by "on" switches can be thought of as a larger "composite PD." By changing the state of the electrical switches, the location and size of each composite PD can be changed. Each composite PD is connected to a transimpedance amplifier (TIA) and subsequent receiver electronics. The connection between a composite PD and a TIA may comprise one or more "on" switches.

The signal from each channel can be recovered by causing the location and size of a composite PD to coincide with that channel's PD plane optical spot. Conceptually, rather than aligning the spots with the PDs, the composite PDs "move" to where the spots are. This allows loose alignment tolerances between the output end of the CFB and the subsequent optics (including the receiver array). By contrast, the use of conventional fixed PD locations often requires translational alignment accuracies of a few microns. The greatly reduced alignment tolerances enabled by a switched PD grid may significantly decrease packaging costs and increase yields relative to a conventional fixed PD arrangement.

In a set of embodiments, analog switches, or analog components associated with digital switches, connect the PDs in a manner such that the output current from each composite PD is the weighted sum of the individual PD currents.

For a given optical distribution on the PD plane, an algorithm can be used to determine how the PDs should be interconnected to maximize the signal from each channel while minimizing inter-channel crosstalk. This is equivalent to moving and resizing the composite PDs.

The algorithm can be implemented, in some embodiments, with low-speed electronics and/or software to measure the current generated from each PD with a training optical distribution on the receiver array. The light falling in each PD is the weighted sum of contributions from the PD plane spots for the various channels. If there are M channels and N PDs, the output current from the PDs can be expressed as:

$$I_{PD} = R_w P_{chan} \quad \text{(Eqn. 1)}$$

where $I_{PD}$ is an N-element vector containing the currents from the N PDs, $P_{chan}$ is an M-element vector containing the optical power from each of the M channels in the PD plane, and $R_w$ is an N× M element matrix that expresses the effective responsivity between each channel and each PD.

The optical power from each channel can be recovered by inverting $R_w$:

$$P_{chan} = R_w^{-1} I_{PD} \quad \text{(Eqn. 2)}$$

In some embodiments this computation is done during a training session. Assuming that the entire LED-to-PD optical link losses are stable over time, in some embodiments this computation is done only during an initial training session.

In a set of embodiments, the light falling on each PD is dominantly associated with a single channel, for example as shown in FIG. 6a. In this case, the effective responsivity matrix $R_w$ is diagonal and the matrix inversion of Equation (2) is trivial.

In another set of embodiments, each PD is overlapped by a maximum of only a few beams, for example as shown in FIG. 6b. In this case, the responsivity matrix $R_w$ will be sparse, allowing sparse matrix computational methods to be used. In another set of embodiments, there is large overlap between beams, for example as shown in FIG. 6c. In this case, not only may the matrix inversion be computationally intensive, but it may not be possible to obtain adequate signal-to-crosstalk ratios to accurately recover the signal from each channel in some instances.

Figure 7B:
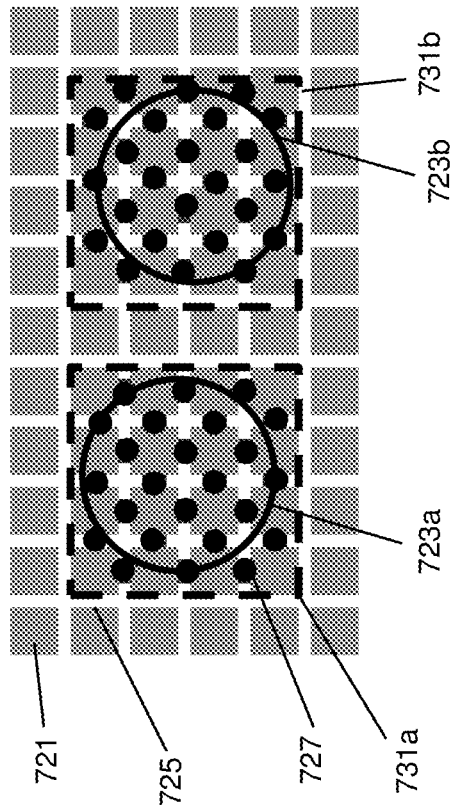
FIG. 7b shows photodetectors with switched connections to neighbors creating optimized composite photodetectors for two spots.
Figure 7A:
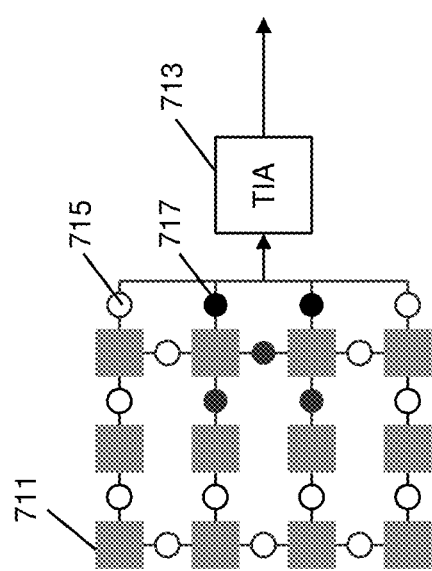
FIG. 7a shows photodetectors switchably connectable to a transimpedance amplifier.

In the set of embodiments with no or little beam overlap, connecting each PD to some subset of its neighbors may be adequate to optimize the composite pixel locations for all beam locations. FIG. 7a shows PDs 711 switchably connectable to a transimpedance amplifier 713. In FIG. 7*a*, twelve PDs are arranged in a 3×4 grid, with photodetectors of each row couplable by switches and photodetectors of the first and last column (third column) also couplable by switches, which may be open 715 or closed 717. The PDs of the last row are also couplable to a TIA by switches. FIG. 7*a* shows a composite PD formed by closing switches coupling the PDs of the middle rows together for the second and third column PDs (as well as closing the switches coupling the PDs of the third column for the PDs in the middle rows). The switches coupling the middle row PDs of the third column are also closed, coupling the composite PD to the TIA. FIG. 7*b* shows PDs with switched connections to neighbors creating optimized composite PDs for two PD plane spots. In FIG. 7*b*, a plurality of PDs, e.g. PD 721, are arranged in a rectangular grid. A first "spot" 723*a* illuminates a first area of the grid, and a second "spot" 723*b* illuminates a second area of the grid. The PDs are couplable by switches. Switches between adjacent PDs at least partially illuminated by the spots are closed 727, which switches between adjacent PDs that are not both at least partially illuminated by the spots are open 725. The result is a first composite PD 731*a* is formed of PDs at least partially illuminated by the first spot, and a second composite PD 731*b* is formed of PDs at least partially illuminated by the second spot.

In a set of embodiments, the PD plane spots are of a known size, center-to-center spacing, and pattern (e.g., square or hexagonal grid). The "uncertainty" associated with the optical misalignments correspond to translations and rotations of this known pattern. Knowledge of this grid pattern can be used to simplify/optimize the connectivity of the switches connecting the PDs, and to simplify computation of the optimal switch states.

Figure 8:
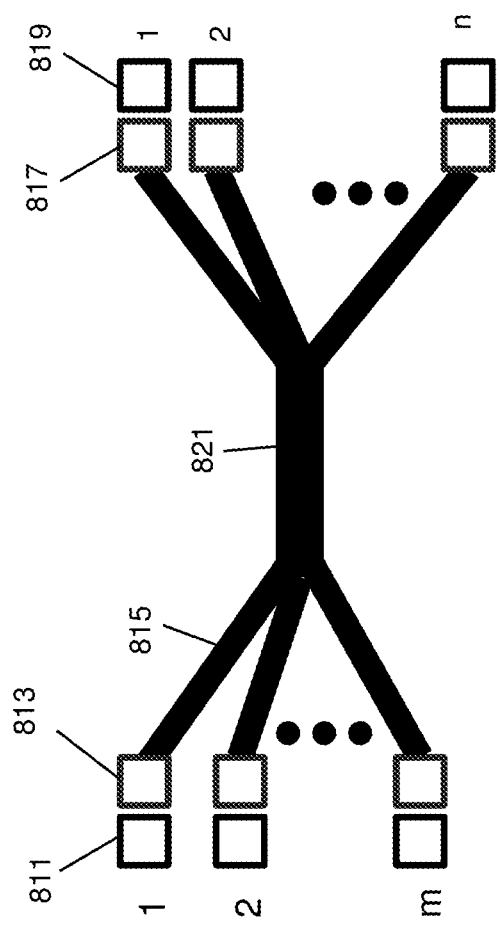
FIG. 8 shows transmitter and receiver sub-arrays coupled by coherent fiber sub-bundles.

In the previous discussions of CFB-based links, a single micro-LED array has been connected by a CFB to a single receiver array. This can be generalized by dividing the transmitter and receiver arrays into sub-arrays and the CFB into sub-bundles. FIG. 8 shows the case of M input assemblies coupled to N output assemblies. Each input and output assembly has the same structure as those for the full bundle of FIG. 3, e.g., a transmitter sub-array 811 coupled to an IAOCA 813 on each input sub-bundle 815 and an OAOCA 817 coupled to a receiver sub-array 819 on each output sub-bundle. The sub-bundles are combined to form a bundle 821.

Preferably the "coherence" is maintained within each sub-bundle, e.g., the relative positions of the output fibers in a sub-bundle are the same as that at the input. The exception to this is that relative fiber positions are obviously not maintained between fibers in different sub-bundles, in some embodiments.

A CFB can be divided into sub-bundles, for example, by removing some of the jacket material that binds a sub-bundle to the rest of the fibers. This can be done by a "leaching" process that utilizes a jacket solvent.

In some sets of embodiments, m=1 and n>1 so the connectivity is that of a splitter. In another set of embodiments, m>1 and n=1 so the connectivity is that of a combiner. In another set of embodiments, m>1 and n>1 so the connectivity is that of a star coupler, if cores of input sub-bundles are distributed amongst the output sub-bundles.

Although the invention has been discussed with respect to various embodiments, it should be recognized that the invention comprises the novel and non-obvious claims supported by this disclosure.

What is claimed is:

1. An optical communication system, comprising:
an optical transmitter array comprising a plurality of individual transmitters each including a drive circuit, a microLED, and microLED collection optics, the microLEDs of the optical transmitter array all attached to a first single substrate, the microLEDs arranged in a regular pattern in a square or hexagonal grid, the microLED collection optics comprising a reflector on the first single substrate for each microLED, so as to reduce an angular cone of optical distribution of the microLED;
a fiber bundle comprised of multimode fibers;
a first optical coupling assembly coupling the fiber bundle to the optical transmitter array, the first optical coupling assembly being between the optical transmitter array and the fiber bundle;
an optical receiver array comprising a plurality of individual receivers each including a photodetector and receiver electronics; and
a second optical coupling assembly coupling the fiber bundle to the optical receiver array.

2. The optical communication system of claim 1, wherein the first optical coupling assembly comprises lenses, and the first optical coupling assembly is configured to relay light from the optical transmitter array to an input face of the fiber bundle.

3. The optical communication system of claim 2, wherein the first optical coupling assembly is configured to couple light from each microLED to a single different core of the multimode fibers.

4. The optical communication system of claim 3, wherein the multimode fibers of the fiber bundle are arranged in a regular pattern matching the regular pattern of the optical transmitters.

5. The optical communication system of claim 2, wherein the second optical coupling assembly comprises lenses, and the second optical coupling assembly is configured to relay light from an output face of the fiber bundle to the optical receiver array.

6. The optical communication system of claim 1, wherein the photodetectors of the optical receiver array are all attached to the single substrate.

7. The optical communication system of claim 1, wherein the fiber bundle is a coherent fiber bundle.

8. The optical communication system of claim 1, wherein the receiver electronics for all of the photodetectors are integrated into a common integrated circuit (IC).

* * * * *